US012761188B2

(12) United States Patent
Usui et al.

(10) Patent No.: US 12,761,188 B2
(45) Date of Patent: Oct. 13, 2026

(54) TEMPERATURE COMPENSATION FOR ACOUSTIC STRUCTURAL MONITORING

(71) Applicant: KABUSHIKI KAISHA TOSHIBA, Tokyo (JP)

(72) Inventors: Takashi Usui, Saitama (JP); Hidefumi Takamine, Tokyo (JP); Kazuo Watabe, Yokohama (JP); Tetsuya Kugimiya, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 376 days.

(21) Appl. No.: 18/173,235

(22) Filed: Feb. 23, 2023

(65) Prior Publication Data

US 2024/0094166 A1 Mar. 21, 2024

(30) Foreign Application Priority Data

Sep. 16, 2022 (JP) ................................ 2022-148052

(51) Int. Cl.
*G01N 29/14* (2006.01)
*G01M 5/00* (2006.01)
(Continued)

(52) U.S. Cl.
CPC ........... *G01N 29/14* (2013.01); *G01N 29/045* (2013.01); *G01N 29/07* (2013.01); *G01N 29/326* (2013.01);
(Continued)

(58) Field of Classification Search
CPC .. G01M 5/0066; G01M 5/0033; G01N 29/14; G01N 29/045; G01N 29/069;
(Continued)

(56) References Cited

U.S. PATENT DOCUMENTS

2007/0046289 A1* 3/2007 Troxler ................ G01N 23/203 324/334
2012/0203474 A1 8/2012 Kawiecki et al.
(Continued)

FOREIGN PATENT DOCUMENTS

CN 1104335 A * 6/1995
CN 1033720 C * 1/1997
(Continued)

OTHER PUBLICATIONS

Robust Damage Detection in Smart Structures Fahit Gharibnezhad Technical University of Catalunya (Year: 2014).*
(Continued)

*Primary Examiner* — Peter J Macchiarolo
*Assistant Examiner* — Monica S Young
(74) *Attorney, Agent, or Firm* — Finnegan, Henderson, Farabow, Garrett & Dunner, LLP

(57) ABSTRACT

According to one embodiment, a structure evaluation system according to an embodiment includes a plurality of sensors, a position locator, a corrector, and an evaluator. The plurality of sensors detect elastic waves generated from a structure. The position locator is configured to locate positions of sources of a plurality of elastic waves detected by the plurality of sensors on the basis of the plurality of elastic waves. The corrector is configured to correct information based on the position location in the position locator using a correction value which is determined according to a temperature of the structure. The evaluator is configured to evaluate a deterioration state of the structure on the basis of the corrected information.

20 Claims, 8 Drawing Sheets

(51) Int. Cl.

| | |
|---|---|
| ***G01N 29/04*** | (2006.01) |
| ***G01N 29/06*** | (2006.01) |
| ***G01N 29/07*** | (2006.01) |
| ***G01N 29/32*** | (2006.01) |
| ***G01N 29/44*** | (2006.01) |
| ***G01S 5/22*** | (2006.01) |

(52) U.S. Cl.

CPC ....... *G01N 29/4427* (2013.01); *G01M 5/0033* (2013.01); *G01M 5/0066* (2013.01); *G01N 29/069* (2013.01); *G01N 2291/0232* (2013.01); *G01N 2291/0258* (2013.01); *G01N 2291/02818* (2013.01); *G01N 2291/02827* (2013.01); *G01N 2291/263* (2013.01); *G01S 5/22* (2013.01)

(58) Field of Classification Search

CPC ................. G01N 29/07; G01N 29/326; G01N 2291/263; G01N 2291/02827; G01N 2291/02818; G01N 2291/0258; G01N 2291/0232; G01N 29/4427; G01S 5/22

USPC ............................................................ 73/587

See application file for complete search history.

(56) References Cited

U.S. PATENT DOCUMENTS

| | | | | |
|---|---|---|---|---|
| 2014/0123758 | A1 | 5/2014 | Gebski et al. | |
| 2017/0021555 | A1 | 1/2017 | Rasmussen | |
| 2017/0363586 | A1* | 12/2017 | Takamine | G01N 29/4454 |
| 2019/0317056 | A1 | 10/2019 | Druet et al. | |
| 2019/0383696 | A1 | 12/2019 | Shiotani et al. | |
| 2020/0217822 | A1 | 7/2020 | Someda et al. | |
| 2022/0050082 | A1* | 2/2022 | Mariani | G01M 5/0058 |
| 2022/0130240 | A1 | 4/2022 | Takamine et al. | |
| 2022/0187253 | A1 | 6/2022 | Takamine et al. | |

FOREIGN PATENT DOCUMENTS

| | | | | | |
|---|---|---|---|---|---|
| CN | 1472882 | A | * | 2/2004 | |
| CN | 2004198188 | A | * | 7/2004 | |
| CN | 1216456 | C | * | 8/2005 | |
| CN | 101315028 | A | * | 12/2008 | |
| CN | 203758546 | U | * | 8/2014 | |
| CN | 110418961 | A | | 11/2019 | |
| CN | 112270663 | A | * | 1/2021 | G01N 25/75 |
| CN | 112771360 | A | * | 5/2021 | G01N 29/44 |
| CN | 114034734 | A | * | 2/2022 | |
| CN | 114152679 | A | | 3/2022 | |
| CN | 118296972 | A | * | 7/2024 | |
| CN | 119618366 | A | * | 3/2025 | G01H 11/08 |
| EP | 3 290 915 | A1 | | 3/2018 | |
| JP | S52-42758 | A | | 4/1977 | |
| JP | 2001-241045 | A | | 9/2001 | |
| JP | 2012-163561 | A | | 8/2012 | |
| JP | 2017-514720 | A | | 6/2017 | |
| JP | 2021-96266 | A | | 6/2021 | |
| JP | 2022-70711 | A | | 5/2022 | |
| WO | WO-2006089414 | A1 | * | 8/2006 | F27D 21/0021 |
| WO | WO 2012/159208 | A1 | | 11/2012 | |
| WO | WO 2017/008824 | A1 | | 1/2017 | |
| WO | WO 2017/217033 | A1 | | 12/2017 | |
| WO | WO 2017/217034 | A1 | | 12/2017 | |
| WO | WO 2020/027652 | A1 | | 2/2020 | |
| WO | WO 2021/081307 | A1 | | 4/2021 | |
| WO | WO 2022/014004 | A1 | | 1/2022 | |

OTHER PUBLICATIONS

Translation JP_2004198188 (Year: 2004).*

Michaels, Jennifer & Michaels, Thomas. (2005). Detection of structural damage from the local temporal coherence of diffuse ultrasonic signals. IEEE transactions on ultrasonics, ferroelectrics, and frequency control. 52. 1769-82. 10.1109/TUFFC.2005.1561631. (Year: 2005).*

University of Catalunya Department of Robust Damage Detection in Smart Structures by Fahit Gharibnezhad Technical University of Catalunya Department of Applied Mathematics III CoDALabs Barcelona, Spain Apr. 2014 (Year: 2014).*

Yokohama Nat'l Univ. Faculty of Sci. and Eng'g Dept. of Mech., Mats. and Ocean Eng'g Mats. Eng'g Ed. Prog., "Materials, temperature and strength," http://www.materep.ynu.ac.jp/archives/info/lec9, 3 pages and machine translation, 3 pages (2020).

J. B. Wachtman, Jr., et al., "Exponential Temperature Dependence of Young's Modulus for Several Oxides," Phys. Rev., vol. 122, No. 6, pp. 1754-1759 (1961).

B. Gutenberg, et al., "Seismicity of the Earth and Associated Phenomena: Frequency and Energy of Earthquakes," , pp. 16-25 (Princeton Univ. Press 1949).

Japan Patent Office, Office Action in JP App. No. 2022-148052 (May 27, 2025).

The State Intellectual Property Office of People's Republic of China, Office Action in CN App. No. 202310129747.6 (Mar. 18, 2026).

* cited by examiner

TEMPERATURE COMPENSATION FOR ACOUSTIC STRUCTURAL MONITORING

CROSS-REFERENCE TO RELATED APPLICATION

This application is based upon and claims the benefit of priority from Japanese Patent Application No. 2022-148052, filed Sep. 16, 2022, the entire contents of which are incorporated herein by reference.

FIELD

Embodiments described herein relate generally to a structure evaluation system, a structure evaluation apparatus, a structure evaluation method, and a non-transitory computer readable recording medium.

BACKGROUND

Elastic waves generated in a structure such as a viaduct can be detected by installing a sensor on the surface of the structure. By installing a plurality of sensors on the surface of the structure, a position of a source of elastic waves (hereinafter referred to as an "elastic wave source") can be located on the basis of differences in arrival time between the elastic waves detected by the sensors. Elastic waves are also generated in the structure when an impact is externally applied to the surface of the structure. In this case, a location of an elastic wave source can be located on the basis of the differences in arrival time between the elastic waves detected by the sensors.

When a propagation path of elastic waves in a structure is damaged, propagation of the elastic waves can be hindered. When propagation of elastic waves is hindered due to damage in the structure, some sensors cannot detect elastic waves. As a result, accuracy of a location result of an elastic wave source decreases. When a spatially uniform impact such as collision of raindrops with a road surface at the time of rainfall is applied to the surface of the structure and elastic waves are detected by the sensors installed on an opposite surface thereof, a density of elastic wave sources in an area having damage therein is observed with a decrease. A deterioration state of a structure (whether there is damage in the structure) can be evaluated using such characteristics.

In the related art, various correction methods for improving evaluation accuracy of a deterioration state of a structure have been proposed. For example, techniques of correcting information based on position location using a correction value which is determined according to an impact even when an impact applied to the surface of a structure is not uniform has been proposed. However, the temperature has not been particularly mentioned in any method according to the related art. Accordingly, when measurement has been performed under different temperature environments such as seasons or time zones, a change due to the temperature may not be corrected and thus evaluation accuracy may not be able to be improved.

DETAILED DESCRIPTION

The present invention provides a problem to be solved by the present invention is to provide a structure evaluation system, a structure evaluation apparatus, a structure evaluation method, and a computer program that can improve evaluation accuracy of a deterioration state of a structure.

According to one embodiment, a structure evaluation system according to an embodiment includes a plurality of sensors, a position locator, a corrector, and an evaluator. The plurality of sensors detect elastic waves generated from a structure. The position locator is configured to locate positions of sources of a plurality of elastic waves detected by the plurality of sensors on the basis of the plurality of elastic waves. The corrector is configured to correct information based on the position location in the position locator using a correction value which is determined according to a temperature of the structure. The evaluator is configured to evaluate a deterioration state of the structure on the basis of the corrected information.

Hereinafter, a structure evaluation system, a structure evaluation apparatus, a structure evaluation method, and a non-transitory computer readable recording medium according to embodiments will be described with reference to the accompanying drawings.

SUMMARY

The inventors found through investigation that a result of measurement of a density of elastic wave sources changes depending on a temperature. Accordingly, with a correction method according to the related art, they found that the change due to the temperature may not be corrected and evaluation accuracy of a deterioration state of a structure may not be able to be improved when measurement is performed under different temperature environments such as seasons or time zones. Therefore, with the structure evaluation system according to the embodiments, it is possible to improve evaluation accuracy of a deterioration state of a structure in consideration of an influence of the temperature at the time of measurement of elastic waves by correcting information based on position location of elastic wave sources on the basis of information on the temperature at the time of measurement. Here, the information based on position location is information which is used before the position location of elastic wave sources is performed (for example, a measurement threshold value of elastic waves) or information which is acquired using the location result.

First Embodiment

Figure 1:
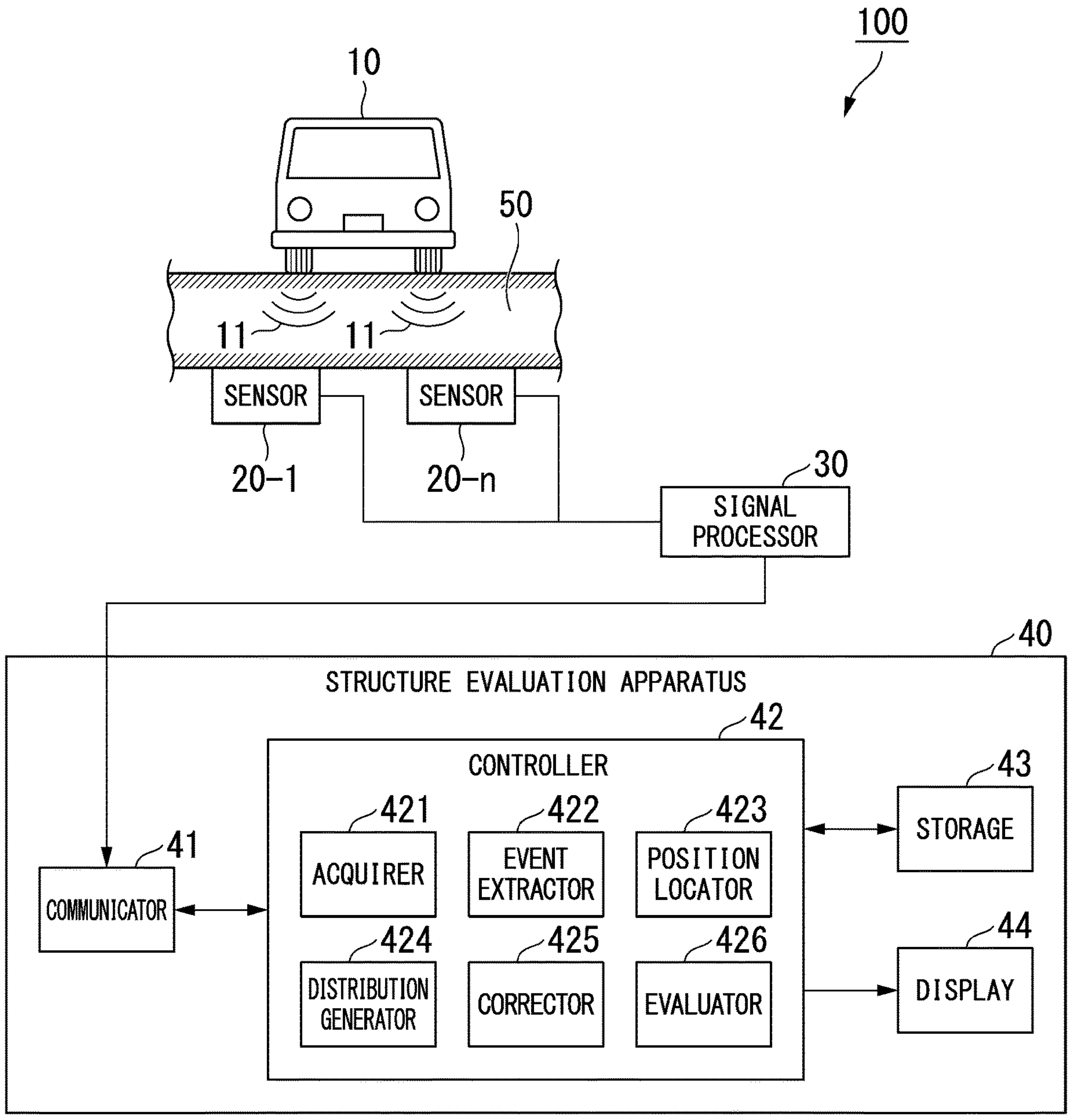
FIG. 1 is a diagram illustrating a configuration of a structure evaluation system according to a first embodiment.

FIG. 1 is a diagram illustrating a configuration of a structure evaluation system 100 according to a first embodiment. The structure evaluation system 100 is used to evaluate soundness of a structure 50. In the following description, evaluation means that a degree of soundness of the structure 50, that is, a deterioration state of the structure 50, is determined on the basis of a certain criterion. The structure 50 in the following embodiment is formed of at least two materials with different responses to temperature. For example, when the structure 50 is a viaduct on which vehicles travel, the structure 50 includes a pavement section on which vehicles can travel and a floor slab section that supports the pavement section. The pavement section 51 is formed of, for example, asphalt and the floor slab section 52 is formed of, for example, concrete.

In the following description, it is assumed that the structure 50 is a viaduct, but the structure 50 is not limited to a viaduct. The structure 50 is a structure which is formed of at least two materials with different responses to temperature and is not particularly limited as long as it is a structure in which elastic waves 11 are generated with occurrence or propagation of cracks or external impacts (for example, rainfall or artificial rainfall). The viaduct is not limited to a structure constructed over a river, a valley, or the like and may include various structures (for example, viaducts of an expressway) provided above the ground surface.

An example of damage affecting evaluation of a deterioration state of the structure 50 is damage in the structure hindering propagation of elastic waves 11 such as cracks, voids, and sand granulation. Cracks include cracks in the vertical direction, cracks in the horizontal direction, and cracks in oblique directions. The cracks in the vertical direction are cracks which are generated in a direction perpendicular to a road surface. The cracks in the horizontal direction are cracks which are generated in a direction parallel to the road surface. The cracks in the oblique directions are cracks which are generated in directions other than the directions parallel to and perpendicular to the road surface. The sand granulation is deterioration in which concrete changes into sand granules at a boundary between asphalt and concrete of a floor slab.

The structure evaluation system 100 includes a plurality of sensors 20-1 to 20-*n*, a signal processor 30, and a structure evaluation apparatus 40. The plurality of sensors 20-1 to 20-*n* and the signal processor 30 are communicatively connected to each other in a wired manner. The signal processor 30 and the structure evaluation apparatus 40 are communicatively connected to each other in a wired or wireless manner. In the following description, the sensors 20-1 to 20-*n* are referred to as a sensor 20 when they are not distinguished.

When a vehicle 10 passes over the structure 50 as illustrated in FIG. 1, a load is applied to a road surface through contact between a traveling unit W of the vehicle 10 and the road surface. A plurality of elastic waves 11 are generated in the structure 50 due to flexure based on the load. The sensors 20 installed on the bottom surface of the structure 50 (for example, the floor slab section 52) can detect the elastic waves 11 generated in the structure 50. Here, it is assumed that elastic waves are generated in the structure 50 due to a vehicle 10, but elastic waves may be generated in the structure 50 using another method. For example, elastic waves may be generated by applying an external impact to the structure 50.

Each sensor 20 includes a piezoelectric element and detects elastic waves 11 generated from the inside of the structure 50. The sensors 20 are installed at positions at which elastic waves 11 can be detected on the surfaces of the structure 50. For example, the sensors 20-1 to 20-*n* are installed on one of a road surface, a side surface, and a bottom surface at the same intervals or different intervals in a vehicle traveling axis direction and a vehicle traveling axis crossing direction. The vehicle traveling axis direction is a direction in which a vehicle travels on the road surface. The vehicle traveling axis crossing direction is a direction perpendicular to the vehicle traveling axis direction. The sensors 20 convert the detected elastic waves 11 into an electrical signal. In the following description, it is assumed that the sensors 20 are installed on the bottom surface of the structure 50.

Each sensor 20 employs, for example, a piezoelectric element having sensitivity in a range of 10 kHz to 1 MHz. The sensor 20 may be of a resonance type having a resonance peak in a frequency range, a wide band type in which resonance is curbed, or the like, and the type of the sensor 20 may be any one thereof. The method with which the sensor 20 detects elastic waves 11 may be of a voltage output type, a resistance change type, a capacitance type, or the like, and any detection method thereof may be used.

Acceleration sensors may be used instead of the sensors 20. In this case, each acceleration sensor detects elastic waves 11 generated in the structure 50. Then, the acceleration sensor converts the detected elastic waves 11 to electrical signals by performing the same process as the sensor 20.

For example, an amplifier and an A/D converter which are not illustrated are provided between the sensors 20 and the signal processor 30.

The amplifier amplifies the electrical signals output from the sensors 20. The amplifier outputs the amplified electrical signals to the A/D converter. The amplifier amplifies the electrical signals, for example, such that they can be processed by the A/D converter.

The A/D converter quantizes the amplified electrical signals and converts the resultant electrical signals to digital signals. The A/D converter outputs the digital signals to the signal processor 30.

The signal processor 30 receives the digital signals output from the A/D converter as an input. The signal processor 30 performs signal processing on the input digital signals. The signal processing performed by the signal processor 30 includes, for example, noise reduction and parameter extraction. The signal processor 30 generates transmission data including the digital signals subjected to the signal processing. The signal processor 30 outputs the generated transmission data to the structure evaluation apparatus 40.

The signal processor 30 is configured as an analog circuit or a digital circuit. The digital circuit is implemented by, for example, a field-programmable gate array (FPGA) or a microcomputer. The digital circuit may be implemented by a dedicated large-scale integration circuit (LSI). A nonvolatile memory such as a flash memory or a removable memory may be mounted in the signal processor 30.

Figure 2:
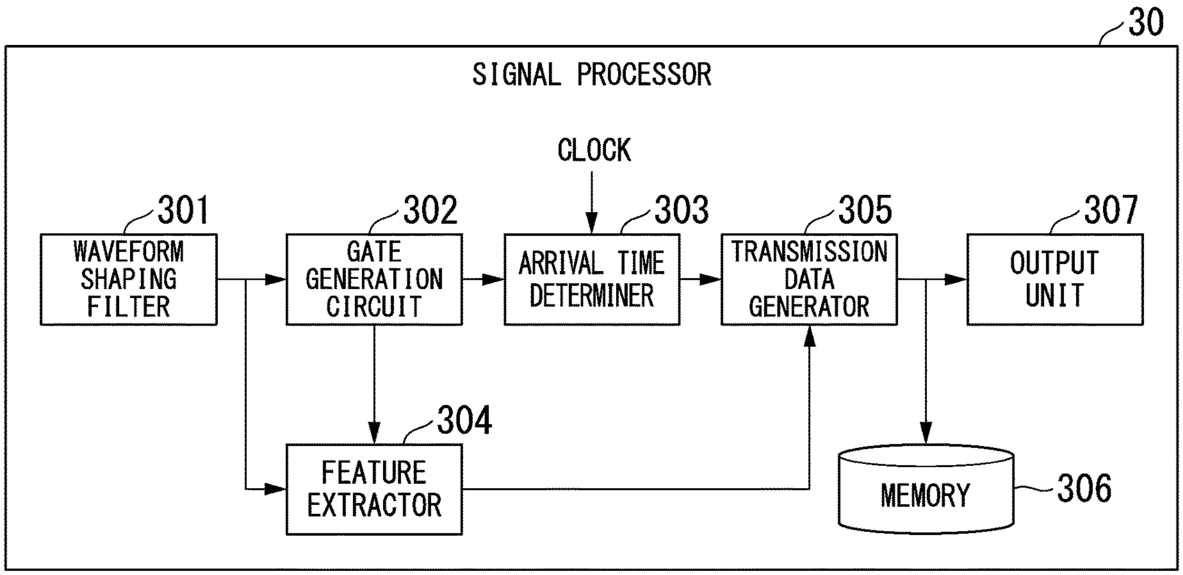
FIG. 2 is a diagram illustrating an example of a functional configuration of a signal processor according to the first embodiment.

FIG. 2 is a diagram illustrating an example of a functional configuration of the signal processor 30 according to the first embodiment. The signal processor 30 includes a waveform shaping filter 301, a gate generation circuit 302, an arrival time determiner 303, a feature extractor 304, a transmission data generator 305, a memory 306, and an output unit 307.

The waveform shaping filter 301 removes noise components outside of a predetermined band from the input digital signals. The waveform shaping filter 301 is, for example, a digital band-pass filter (BPF). The waveform shaping filter 301 outputs a digital signal from which noise components have been removed (hereinafter referred to as a "noise-removed signal") to the gate generation circuit 302 and the feature extractor 304.

The gate generation circuit 302 receives the noise-removed signal output from the waveform shaping filter 301 as an input. The gate generation circuit 302 generates a gate signal on the basis of the input noise-removed signal. The gate signal is a signal indicating whether a waveform of the noise-removed signal is sustained.

The gate generation circuit 302 is implemented by, for example, an envelope detector and a comparator. The envelope detector detects an envelope of the noise-removed signal. The envelope is extracted, for example, by squaring the noise-removed signal and performing a predetermined process (for example, a process using a low-pass filter or Hilbert transformation) on the squared output value. The comparator determines whether the envelope of the noise-removed signal is equal to or greater than a predetermined threshold value.

When the envelope of the noise-removed signal is equal to or greater than the predetermined threshold value, the gate generation circuit 302 outputs a first gate signal indicating that the waveform of the noise-removed signal is sustained to the arrival time determiner 303 and the feature extractor 304. On the other hand, when the envelope of the noise-removed signal is less than the predetermined threshold value, the gate generation circuit 302 outputs a second gate signal indicating that the waveform of the noise-removed signal is not sustained to the arrival time determiner 303 and the feature extractor 304. A configuration in which the gate generation circuit 302 determines whether the waveform of the noise-removed signal is sustained on the basis of the envelope has been described, but the gate generation circuit 302 may perform a process on the noise-removed signal or a signal employing the absolute value thereof. The threshold value used to generate the gate signal is referred to as a measurement threshold value.

The arrival time determiner 303 receives a clock output from a clock source such as a quartz oscillator which is not illustrated and the gate signal output from the gate generation circuit 302 as inputs. The arrival time determiner 303 determines an elastic wave arrival time using the clock which is input while the first gate signal is being input. The arrival time determiner 303 outputs the determined elastic wave arrival time as time information to the transmission data generator 305. The arrival time determiner 303 does not perform the process while the second gate signal is being input. The arrival time determiner 303 generates cumulative time information after a power-on time on the basis of a signal from the clock source. Specifically, the arrival time determiner 303 may be a counter for counting edges of a clock and the value of a register of the counter may be used as time information. The register of the counter is determined to have a predetermined bit length.

The feature extractor 304 receives the noise-removed signal output from the waveform shaping filter 301 and the gate signal output from the gate generation circuit 302 as inputs. The feature extractor 304 extracts features of the noise-removed signal using the noise-removed signal which is input while the first gate signal is being input. The feature extractor 304 does not perform the process while the second gate signal is being input. The features are information indicating features of the noise-removed signal.

Examples of the features include amplitude [mV] of a waveform, an ascending time [μsec] of a waveform, a sustainment time [μsec] of a gate signal, a zero-cross count [times], and energy [arb.], a frequency [Hz], and a root mean square (RMS) value of a waveform. The feature extractor 304 outputs parameters associated with the extracted features to the transmission data generator 305. The feature extractor 304 correlates the parameters associated with the features with a sensor ID in outputting the parameters associated with the features. The sensor ID indicates identification information for identifying the sensor 20 which is installed in an area in which soundness of the structure 50 is to be evaluated (hereinafter referred to as an "evaluation area").

The amplitude of a waveform is, for example, a value of the maximum amplitude in the noise-removed signal. The ascending time of a waveform is, for example, a time T1 from an ascending start of the gate signal until the noise-removed signal reaches a maximum value. The sustainment time of the gate signal is, for example, time from ascending start of the gate signal until the amplitude is less than a preset value. The zero-cross count is, for example, the number of times the noise-removed signal crosses a reference line passing through a zero value.

The energy of a waveform is, for example, a value obtained by integrating a square of the amplitude of the noise-removed signal at each time point with respect to the time. Definition of energy is not limited to the aforementioned example, but may be, for example, approximation using an envelope of a waveform. The frequency is a frequency of the noise-removed signal. The RMS value is, for example, a value obtained by squaring the amplitude of the noise-removed signal and taking a square root thereof at each time point.

The transmission data generator 305 receives the sensor ID, the time information, and the parameters associated with the features as inputs. The transmission data generator 305 generates transmission data including the input sensor ID, the input time information, and the input parameters associated with the features.

The memory 306 stores the transmission data. The memory 306 is, for example, a dual port random access memory (RAM).

The output unit 307 sequentially outputs the transmission data stored in the memory 306 to the structure evaluation apparatus 40.

Description will be continued with reference back to FIG. 1. The structure evaluation apparatus 40 includes a communicator 41, a controller 42, a storage 43, and a display 44.

The communicator 41 receives the transmission data output from the signal processor 30.

The controller 42 controls the structure evaluation apparatus 40 as a whole. The controller 42 is constituted by a processor such as a central processing unit (CPU) and a memory. The controller 42 serves as an acquirer 421, an event extractor 422, a position locator 423, a distribution generator 424, a corrector 425, and an evaluator 426 by executing a program.

Some or all of functional units of the acquirer 421, the event extractor 422, the position locator 423, the distribution generator 424, the corrector 425, and the evaluator 426 may be implemented by hardware such as an application-specific integrated circuit (ASIC), a programmable logic device (PLD), or an FPGA or may be cooperatively implemented by software and hardware. The program may be stored in a computer-readable recording medium. The computer-readable recording medium is, for example, a non-transitory storage medium such as a portable medium such as a flexible disk, a magneto-optical disc, a ROM, or a CD-ROM or a storage device such as a hard disk incorporated into a computer system. The program may be transmitted via a telecommunication line.

Some functions of the acquirer 421, the event extractor 422, the position locator 423, the distribution generator 424, the corrector 425, and the evaluator 426 do not have to be mounted in the structure evaluation apparatus 40 in advance and may be implemented by installing an additional application program in the structure evaluation apparatus 40.

The acquirer 421 acquires various types of information. For example, the acquirer 421 acquires the transmission data received by the communicator 41. For example, the acquirer 421 acquires temperature information of the structure 50. The temperature information of the structure 50 is temperature information in the vicinity of the structure 50 to be evaluated. The temperature information in the vicinity of the structure 50 to be evaluated may be, for example, an atmospheric temperature in the vicinity of the structure 50 to be evaluated or may be a temperature of an affected part (for example, the pavement section) of the structure 50 which is directly affected by an increase in temperature due to solar radiation.

The acquirer 421 may acquire the temperature information of the structure 50 using any method. For example, the acquirer 421 may acquire the temperature information measured by a temperature sensor which is installed in the vicinity of the structure 50, may acquire the temperature information in the vicinity of the structure 50 which is provided through weather forecast or the like, or may directly acquire the temperature information from the affected part. When the acquirer 421 acquires the temperature information measured by the temperature sensor installed in the vicinity of the structure 50 or when the acquirer 421 directly acquires the temperature information from the affected part, the structure evaluation system 100 includes the temperature sensor. The acquirer 421 stores the acquired transmission data or the acquired temperature information in the storage 43. The acquirer 421 according to the first embodiment acquires information on vehicles 10 having traveled on the structure 50 to be evaluated (hereinafter referred to as "vehicle information) for a predetermined period.

The vehicle information includes, for example, vehicle model information of the vehicles 10 having traveled on the structure 50 in the predetermined period and traffic volume information of the vehicles 10 on the structure 50. The vehicle model information of the vehicles 10 includes at least tread width information of the vehicles 10. The traffic volume information of the vehicles 10 is information indicating how many vehicles 10 of what vehicle models have passed over the structure 50 in the predetermined period. The acquirer 421 may acquire the vehicle information through a user's input or may acquire the vehicle information from a server storing traffic information.

The event extractor 422 extracts transmission data in an event out of the transmission data stored in the storage 43. The event means an elastic wave generation event having occurred in the structure 50. The elastic wave generation event in this embodiment is passage of a vehicle 10 over a road surface. When one event has occurred, elastic waves 11 are detected substantially at the same time by the plurality of sensors 20. That is, transmission data on the elastic waves 11 detected substantially at the same time is stored in the storage 43. Therefore, the event extractor 422 provides a predetermined time window and extract all transmission data in which an arrival time is within the range of the time window as transmission data in one event. The event extractor 422 outputs the extracted transmission data in one event to the position locator 423.

The range Tw of the time window may be determined using an elastic wave propagation speed v in the structure 50 to be evaluated and a maximum sensor interval dmax such that $Tw \geq dmax/v$ is satisfied. Since Tw is preferably set to be as small as possible in order to avoid erroneous detection, $Tw = dmax/v$ can be substantially set. The elastic wave propagation speed v may be calculated in advance.

The position locator 423 locates positions of elastic wave sources on the basis of sensor position information and sensor IDs and time information included in a plurality of pieces of transmission data extracted by the event extractor 422.

The sensor position information includes information on installation positions of the sensors 20 in correlation with the sensor IDs. The sensor position information includes, for example, information on installation positions of the sensors 20 such as latitude and longitude or distances in the horizontal direction and the vertical direction from a reference position of the structure 50. The position locator 423 stores the sensor position information in advance. The sensor position information may be stored in the position locator 423 at any timing before position location of elastic wave sources is performed by the position locator 423.

The sensor position information may be stored in the storage 43. In this case, the position locator 423 acquires the sensor position information from the storage 43 at a timing at which the position location is performed. A Kalman filter, a least square method, or the like may be used to locate positions of elastic wave sources. The position locator 423 outputs position information of elastic wave sources acquired in the measuring period to the distribution generator 424.

The distribution generator 424 receives the position information of a plurality of elastic wave sources output from the position locator 423 as an input. The distribution generator 424 generates an elastic wave source distribution using the input position information of the plurality of elastic wave sources. The elastic wave source distribution indicates a distribution in which positions of the elastic wave sources are marked. More specifically, the elastic wave source distribution is a distribution in which points indicating positions of elastic wave sources are marked in virtual data representing the structure 50 to be evaluated with the horizontal axis set to a distance in a passing direction and with the vertical axis set to a distance in the lateral direction. The distribution generator 424 generates an elastic wave source density distribution using the elastic wave source distribution. The elastic wave source density distribution represents a distribution in which a value of a density calculated according to the number of elastic wave sources included in each area is expressed for each predetermined area in the elastic wave source distribution.

The corrector 425 corrects information based on position location in the position locator 423 using a correction value which is determined according to the temperature information of the structure 50 acquired by the acquirer 421. The temperature information of the structure 50 is a value associated with the temperature of the pavement section 51 and is, for example, one of an atmospheric temperature, a temperature of a bottom surface of the floor slab section 52, a road surface temperature (the temperature of the pavement section 51) measured by vehicles traveling on the pavement section 51 or manually, an amount of solar radiation, a statistic value of measured temperatures, a difference between the temperature of the pavement section 51 and the temperature of the floor slab section 52, and a ratio between the temperature of the pavement section 51 and the temperature of the floor slab section 52. The temperature of the pavement section 51 may be a value estimated on the basis of at least one of the atmospheric temperature and the amount of solar radiation. The temperature of the floor slab section 52 is a temperature of a floor slap bottom.

The correction value which is determined according to the temperature information of the structure 50 in the first embodiment is a correction value for correcting the density in the elastic wave source density distribution. The information based on the position location in the first embodiment is the elastic wave source density distribution.

The evaluator 426 evaluates a determination state of the structure 50 on the basis of the corrected information. Specifically, the evaluator 426 evaluates the deterioration state of the structure 50 using the corrected elastic wave source density distribution. For example, the evaluator 426 evaluates an area in which the density of elastic wave sources is equal to or greater than a threshold value to be a sound area and evaluates an area in which the density of elastic wave sources is less than the threshold value to be a damaged area. An area through which a dotted line indicating a propagation path of elastic wave from each elastic wave to each sensor 20 passes is an evaluation area. Therefore, the evaluator 426 evaluates the deterioration state of the structure in the evaluation area.

The transmission data, the temperature information, the vehicle information, and the correction table acquired by the acquirer 421 are stored in the storage 43. The correction table is a table which is used for the corrector 425 to perform correction. In the correction table, values of a Young's modulus at each temperature are registered in correlation. For example, a value of a Young's modulus $E_{20}$ at the temperature of 20° C. or a value of a Young's modulus $E_{25}$ at the temperature of 25° c. are registered in the correction table. Accordingly, the acquirer 421 can convert the temperature information to Young's moduli and use the converted Young's moduli for processing. The storage 43 is constituted by a storage device such as a magnetic hard disk device or a semiconductor storage device.

The display 44 displays an evaluation result under the control of the evaluator 426. The display 44 displays a dotted line group indicating propagation paths of elastic waves from an elastic wave source to the sensors 20, for example, using a projection method under the control of the evaluator 426. The display 44 is an image display device such as a liquid crystal display or an organic electroluminescence (EL) display. The display 44 may be an interface for connecting the image display device to the structure evaluation apparatus 40. In this case, the display 44 generates an image signal for displaying an evaluation result and outputs the image signal to the image display device connected thereto.

Figure 3:
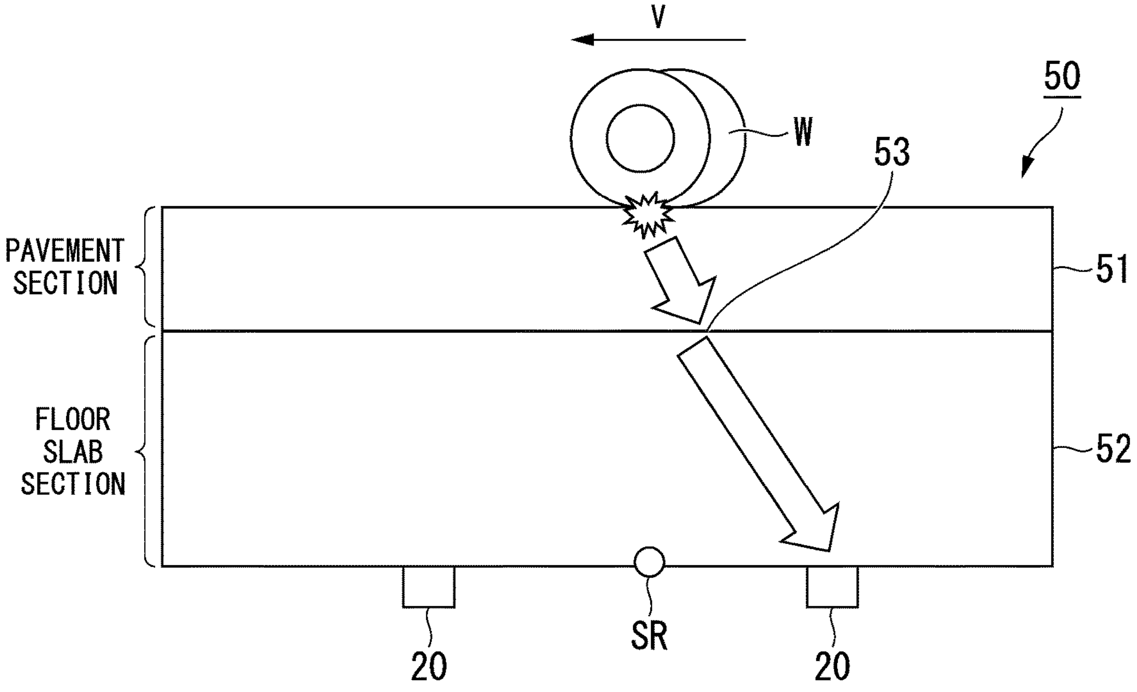
FIG. 3 is a diagram illustrating a method of measuring elastic waves according to the first embodiment.

A correction process which is performed by the corrector 425 will be specifically described below. First, a relationship between a temperature and a density of elastic wave sources which is required for describing the correction process in the corrector 425 will be described. FIG. 3 is a diagram illustrating an elastic wave measuring method according to the first embodiment. In FIG. 3, it is considered that internal damage in the structure 50 is evaluated on the basis of elastic waves generated by a traveling unit W (for example, a tyre) of a vehicle traveling on the road surface as an example of the elastic wave measuring method. Here, it is assumed that the structure 50 is a road on which vehicles travel. The vehicles are not particularly limited and may be regular traveling vehicles. Since elastic waves generated by a regular traveling vehicle are used, vehicle limitation does not need to be performed for inspection, which contributes to improvement of a user's convenience. A load is applied to the road surface due to a contact between the traveling unit W of a vehicle and the road surface. Accordingly, elastic waves are generated in the structure 50. The generated elastic waves propagate in the structure 50 and are detected by the sensors 20 installed on a surface (for example, a bottom surface) other than the road surface.

The structure 50 generally includes a pavement section 51 and a floor slab section 52. The thickness of a general pavement section 51 is about 80 mm, and the thickness of the floor slab section 52 is about 180 mm to 230 mm. Elastic waves (with amplitude $A_{src}$) generated due to an interaction between the traveling unit W of a vehicle traveling on the road surface at a speed V and the surface of the pavement section 51 propagate to the bottom surface of the floor slab section 52. On the way, the elastic waves are partially reflected and partially transmitted by an interface 53 between the pavement section 51 and the floor slab section 52 due to a difference in acoustic impedance. The transmittance at this time is defined as $L_r$. The elastic waves propagating to the bottom surface of the floor slab section 52 arrive at the sensors 20 and are detected by the sensors 20. The amplitude of the detected elastic waves is defined as A. A plurality of sensors 20 are installed on the bottom surface of the floor slab section 52, and the elastic waves are detected by the sensors 20 with time differences. A position of an elastic wave sources SR is located on the basis of the time difference when the elastic waves have been detected by the sensors.

Behavior of elastic waves when a change in temperature has occurred will be described below. It is known that a Young's modulus of a material has temperature dependency. This is because an average interatomic distance r increases on the basis of potential characteristics when the temperature T increases (thermal expansion). In general, in asphalt of the pavement section 51 and concrete of the floor slab section 52, an influence on thermal expansion due to a change in temperature of the pavement section 51 directly affected by solar radiation is dominant. With the thermal expansion, a Yong's modulus E also changes. For example, there is a relationship that the Young's modulus E decreases as the interatomic distance r increases. It is known that the relationship between the temperature and the Young's modulus can be approximated by the Wachtman Equation of Expression (1). The relationship between the temperature and the Young's modulus is specifically described in Citation 1.

(Citation 1: "Material, Temperature, and Strength," Yokohama National University [online], [searched on Sep. 8, 2022], Internet <URL: http://www.materep.ynu.ac.jp/archives/info/lec9>

$$E = E_0 - BTe^{-\frac{T_C}{T}} \tag{1}$$

Coefficient B in Expression (1) is a value specific to a material. A relationship that the Young's modulus E decreases as the temperature increases is derived by Expression (1). With a normal material, the slope approaches zero at T=0 K and is considered as being almost linear (a quasilinear relationship) near 300 K. The Young's modulus E and the volume modulus K satisfy a relationship expressed by Expression (2) using a Poison's ratio ν.

$$K = \frac{E}{3(1-2\nu)} \quad (2)$$

A relationship that the volume modulus K decreases as the Young's modulus E decreases is derived by Expression (2). The acoustic impedance Z is defined by Expression (3) using the density p and the volume modulus K.

$$Z=\sqrt{\rho K} \quad (3)$$

Figure 4:
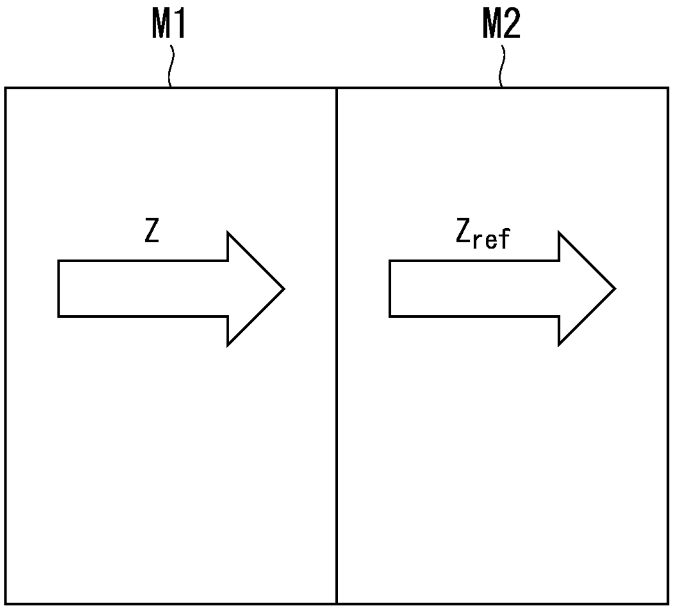
FIG. 4 is a diagram illustrating a relationship between an acoustic impedance and a transmittance according to the first embodiment.

A relationship that the acoustic impedance Z decreases as the volume modulus K decreases is derived by Expression (3). Here, as illustrated in FIG. 4, elastic waves propagating two materials (materials M1 and M2) with difference acoustic impedances are considered. In FIG. 4, $Z<Z_{ref}$ is satisfied. A transmittance $L_t$ of elastic waves passing through the material M2 with the acoustic impedance $Z_{ref}$ from the material M1 with the acoustic impedance Z can be expressed by Expression (4). Particularly, the transmittance $L_t$ when $Z<<Z_{ref}$ is satisfied can be expressed by an approximation expression $2Z/Z_{ref}$.

$$L_t = \frac{2Z}{Z+Z_{ref}} \approx \frac{2Z}{Z_{ref}} \quad (4)$$

Acoustic impedances of asphalt and concrete generally satisfy conditions that the approximation expression of Expression (4) can be applied. For example, the material M1 corresponds to the pavement section 51, and the material M2 corresponds to the floor slab section 52. Since the pavement section 51 is directly affected by solar radiation, a change in temperature thereof is larger than that of the floor slab section 52. Accordingly, the transmittance $L_t$ is more affected by a change of the acoustic impedance Z corresponding to the pavement section 51. Accordingly, a relationship that the transmittance $L_t$ decreases as the acoustic impedance Z decreases is derived by Expression (4). When material damping is ignored, the amplitude A of elastic waves arriving at the sensors 20 has a value obtained by multiplying the amplitude $A_{src}$ of an elastic wave source by the transmittance $L_t$ as expressed by Expression (5).

$$A=A_{src}\cdot L_t \quad (5)$$

A relationship that the amplitude A of elastic waves decreases as the transmittance $L_4$ decreases is derived by Expression (5). When logarithmic amplitude $A_{dB}$ of the elastic waves detected by the sensors 20 is greater than a predetermined measurement threshold value, it is recognized as a hit. In this way, when logarithmic amplitude $A_{dB}$ is not greater than the predetermined measurement threshold value, it is not recognized as a hit. Accordingly, the amplitude A of elastic waves and a hit count (an AE hit count) of elastic waves have a relationship that the hit count of elastic waves decreases as the amplitude A of elastic waves decreases. It is empirically known that the logarithmic amplitude $A_{dB}$ and the hit count $N_{ae}$ have a relationship expressed by Expression (6). This is similar to the Gutenberg-Richter rule in seismology. The Gutenberg-Richter rule is described in Citation 2.

(Citation 2: B. Gutenberg and C. F. Richter, "Seismicity of the Earth and Associated Phenomena", Princeton Univ. Press, 1949.)

$$A_{dB}=20\cdot\log A \propto \log N_{ae} \quad (6)$$

A part of the hit count $N_{ae}$ is detected by the plurality of sensors 20 and is recognized as the number of events $N_{ev}$. An event ratio at this time is defined as $P_{ev}$. An event is an elastic wave generation event occurring in the structure 50. The elastic wave generation event in this embodiment is, for example, passage of a vehicle over the road surface. When one event occurs, elastic waves are detected (hit) by the plurality of sensors 20 substantially at the same time. Accordingly, the number of events $N_{ev}$ is based on the hit count $N_{ae}$ detected by the plurality of sensors 20 at the same time. Accordingly, a relationship that the number of events $N_{ev}$ decreases as the hit count $N_{ae}$ decreases is derived. When the number pf passing vehicles is defined as $n_{car}$ and the measurement area is defined as S, a density D of elastic wave sources per unit area for each vehicle can be expressed by Expression (7).

$$D = \frac{n_{ev}}{n_{car}\cdot S} = \frac{P_{ev}\cdot N_{ae}}{n_{car}\cdot S} \quad (7)$$

A relationship that the density D of elastic wave sources decreases as the number of events $N_{ev}$ decreases is derived by Expression (7). Through summarization of these relationships, there is a negative correlation between the Young's modulus E and the temperature T of the pavement section 51 and there is a linear relationship on two logarithmic axes between the Young's modulus E of the pavement section 51 and the density D of elastic wave sources. That is, a relationship of Expression (8) is satisfied.

$$\log E \propto \log D \quad (8)$$

Figure 5:
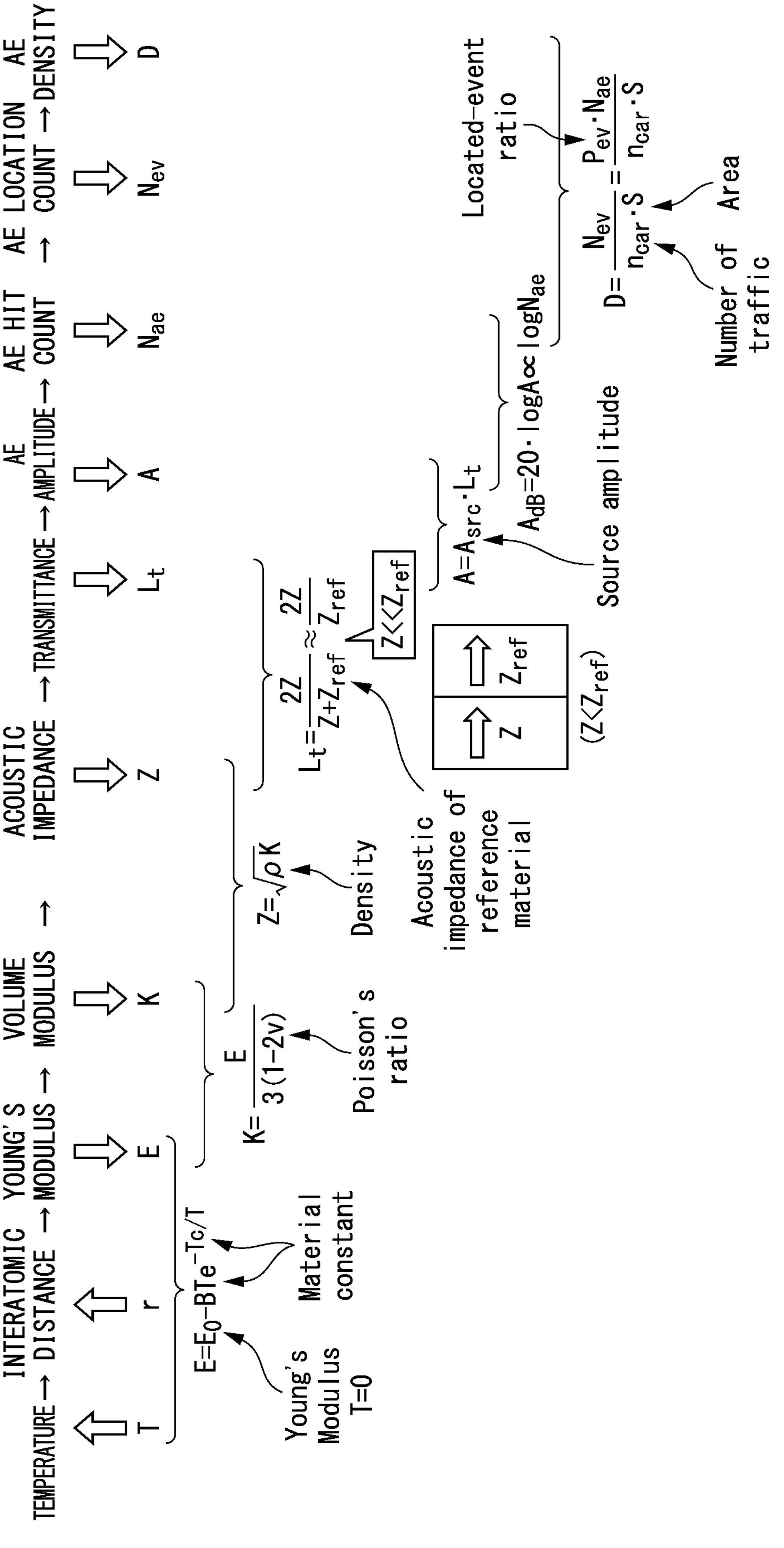
FIG. 5 is a diagram illustrating a relationship between a temperature and a density of elastic waves according to the first embodiment.

Accordingly, it was seen that there is a negative correlation between the temperature T and the density D of elastic wave sources. Through summarization of the aforementioned dependency, a relationship illustrated in FIG. 5 is derived. FIG. 5 is a diagram illustrating a relationship between the temperature T and the density D of elastic wave sources. As illustrated in FIG. 5, it is known that an influence propagates such as temperature T of the pavement section 51→interatomic distance→Young's modulus→volume modulus→acoustic impedance→transmittance→AE amplitude→AE hit count→AE location count→AE density. In the following description, the interatomic distance, the Young's modulus, the volume modulus, the acoustic impedance, the transmittance, the AE amplitude, the AE hit count, and the AE location count are referred to as intermediate parameters indicating a relationship from the temperature to the AE density. The intermediate parameters have values associated with the temperature of the pavement section 51. As a result, it can be seen that the density D of elastic wave change as the temperature T changes. For example, it can be seen that the density D of elastic wave decreases as the temperature T increases and the density D of elastic wave increases as the temperature T decreases.

(Correction Method in First Embodiment)

Figure 6:
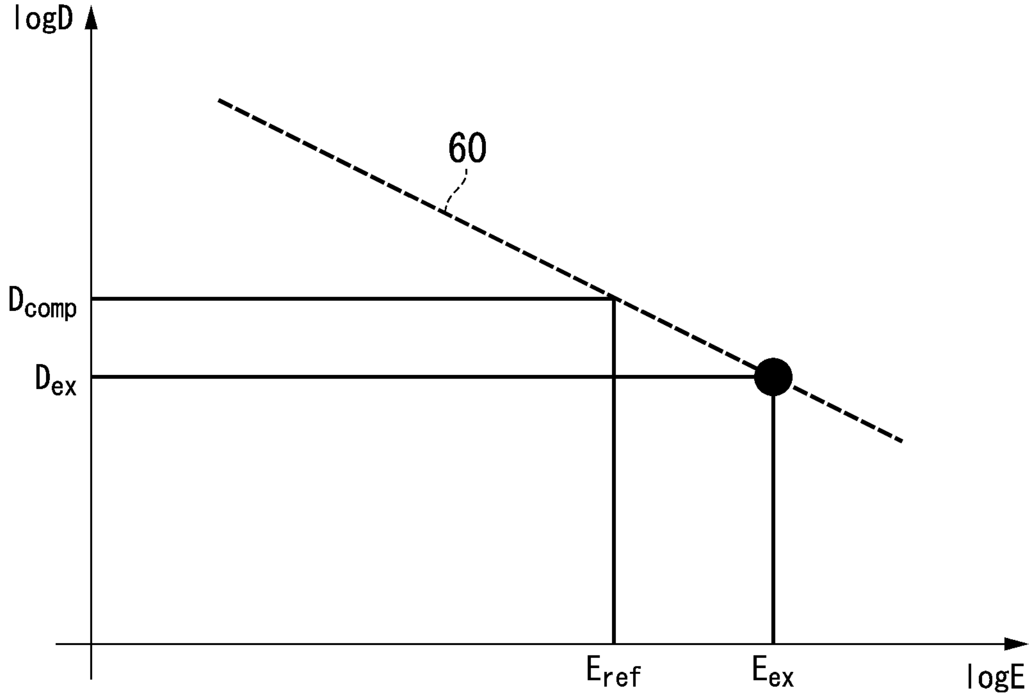
FIG. 6 is a diagram illustrating a correction process which is performed by a corrector according to the first embodiment.

A correction process that is performed by the corrector 425 in the first embodiment will be described below with reference to FIG. 6. In FIG. 6, $E_{ex}$ denotes a Young's modulus corresponding to the temperature at the time of measurement, $D_{ex}$ denotes a measured density of elastic wave sources (a density in a certain area in the elastic wave source density distribution), $E_{ref}$ denotes a Young's modulus corresponding to a reference temperature (for example, 20° C.), and $D_{comp}$ denotes a corrected density of elastic wave sources. In FIG. 6, $E_{ex}$, $D_{ex}$, $E_{ref}$, and $D_{comp}$ are expressed by logarithms. In FIG. 6, a correction line 60 is a straight line used for correction based on the relationship between the density D of elastic wave sources and the Young's modulus E. The correction line 60 is obtained by preparing two logarithmic plots of the density D of elastic wave sources acquired under a plurality of temperature conditions in advance and the Young's modulus E. The correction line 60 has a predetermined slope according to the density D of elastic wave sources acquired under a plurality of temperature conditions in advance and the Young's modulus E.

For example, the correction line 60 is calculated as follows. Beforehand, the density D of elastic wave sources and the Young's modulus E are calculated under different temperature conditions (for example, 20° C., 25° C., and 30° C., . . . ). Logarithms of the density D of elastic wave sources and the Young's modulus E acquired under each temperature condition are taken. The correction line 60 is acquired by preparing two logarithmic plots of the density D of elastic wave sources and the Young's modulus E based on the acquired temperature conditions. The acquired correction line 60 may be stored in the storage 43.

The corrector 425 corrects the elastic wave source density distribution on the basis of the temperature information at the time of measurement of elastic waves, the correction table stored in the storage 43, and the correction line 60. At this time, the corrector 425 corrects the elastic wave source density distribution by correcting the density for each area in the elastic wave source density distribution. First, the corrector 425 acquires the temperature information from the acquirer 421. Then, the corrector 425 acquires the value of the Young's modulus corresponding to the temperature indicated by the acquired temperature information with reference to the correction table. For example, when the temperature is $T_{ex}$, the corrector 425 acquires the Young's modulus $E_{ex}$ corresponding to the temperature $T_{ex}$ at the time of measurement from the correction table.

Then, the corrector 425 acquires the density $D_{ex}$ of elastic wave sources in one area in the elastic wave source density distribution. The corrector 425 sets the correction line 60 at an intersection of the Young's modulus $E_{ex}$ and the density $D_{ex}$ of elastic wave sources on the two logarithm plots of the density D of elastic wave sources and the Young's modulus E (the horizontal axis represents the logarithm of the Young's modulus E and the vertical axis represents the logarithm of the density D of elastic wave sources). The corrector 425 acquires the corrected density $D_{comp}$ of elastic wave sources derived from the Young's modulus $E_{ref}$ corresponding to the reference temperature as a correction value with reference to the correction line 60 set on the two logarithm plot of the density D of elastic wave sources and the Young's modulus E. Then, the corrector 425 performs correction such that density D of elastic wave sources in one area reaches the correction value (for example, the density $D_{comp}$ of elastic wave sources). The corrector 425 performs the same process on every area. Accordingly, the elastic wave source density distribution is corrected.

Figure 7:
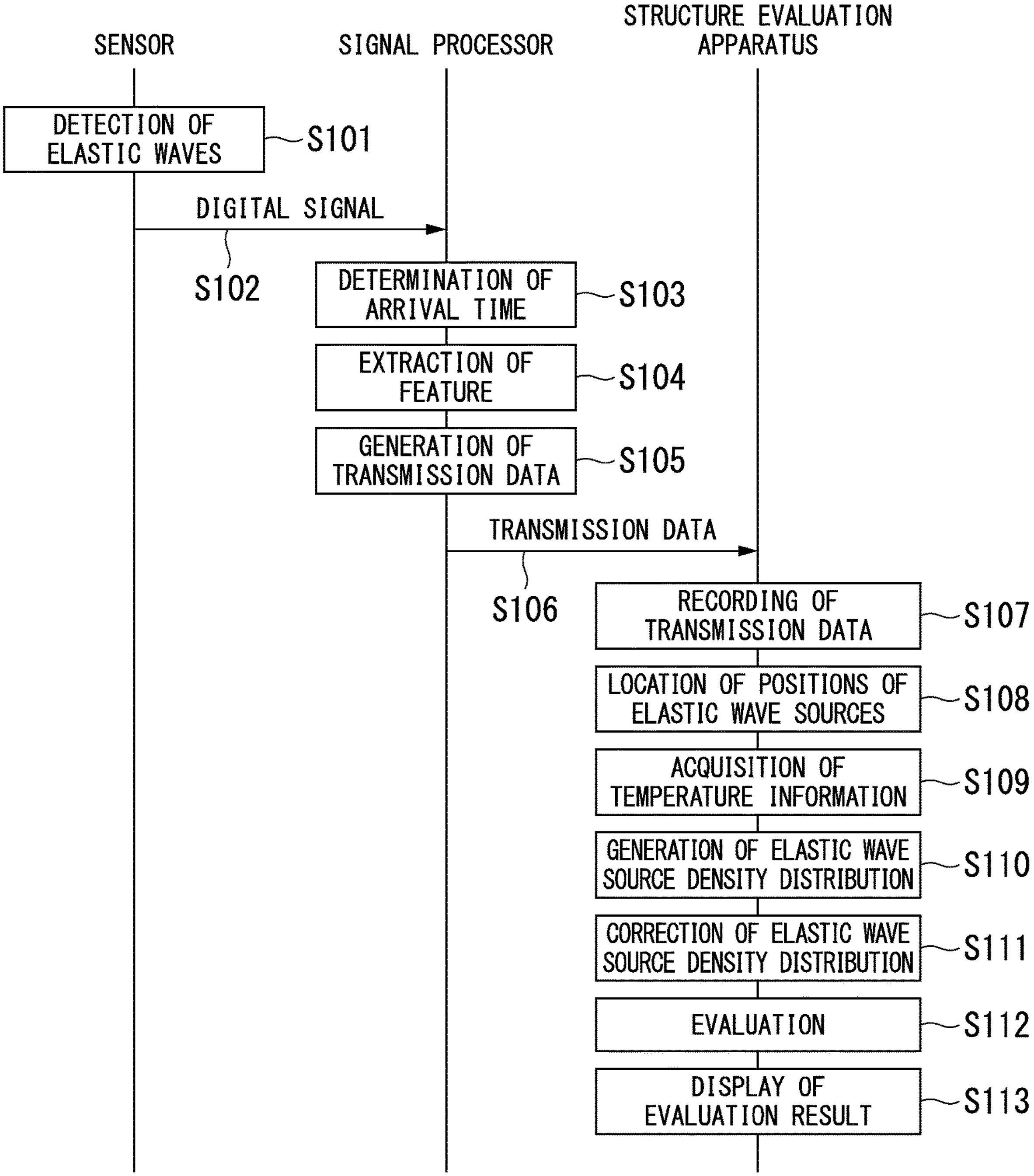
FIG. 7 is a sequence diagram illustrating a sequence of a routine of evaluating a deterioration state which is performed by the structure evaluation system according to the first embodiment.

FIG. 7 is a sequence diagram illustrating a routine of a deterioration state evaluating process which is performed by the structure evaluation system 100 according to the first embodiment. The routine in FIG. 7 is performed when a vehicle 10 travels on the structure 50 to be evaluated.

When a vehicle 10 travels on the structure 50 to be evaluated, the traveling unit of the vehicle 10 comes into contact with the road surface. Accordingly, elastic waves 11 are generated in the structure 50. Each of the plurality of sensors 20 detects the elastic waves 11 generated in the structure 50 (Step S101). Each of the plurality of sensors 20 converts the detected elastic waves 11 to an electrical signal and outputs the electrical signal to the signal processor 30 (Step S102). The electrical signal output from each of the plurality of sensors 20 is amplified by an amplifier which is not illustrated. The amplified electrical signal is converted to a digital signal by the A/D converter.

The signal processor 30 receives the digital signal output from the A/D converter as an input. The arrival time determiner 303 of the signal processor 30 determines an arrival time of each elastic wave 11 (Step S103). Specifically, the arrival time determiner 303 determines an elastic wave arrival time using a clock input while the first gate signal is being input. The arrival time determiner 303 outputs the determined elastic wave arrival time as time information to the transmission data generator 305. The arrival time determiner 303 performs this process on all the input digital signals.

The feature extractor 304 of the signal processor 30 extracts a feature of a noise-removed signal using the noise-removed signal which is a digital signal input while the first gate signal is being input (Step S104). The feature extractor 304 outputs parameters associated with the extracted feature to the transmission data generator 305. The transmission data generator 305 generates transmission data including the sensor IDs, the time information, and the parameters associated with the feature (Step S105). The output unit 307 sequentially outputs the transmission data to the structure evaluation apparatus 40 (Step S106).

The communicator 41 of the structure evaluation apparatus 40 receives the transmission data output from the signal processor 30. The acquirer 421 acquires the transmission data received by the communicator 41. The acquirer 421 records the acquired transmission data in the storage 43 (Step S107). The event extractor 422 extracts the transmission data in one event out of the transmission data stored in the storage 43. The event extractor 422 outputs the extracted transmission data in one event to the position locator 423 and the distribution generator 424.

The position locator 423 locates positions of elastic wave sources on the basis of the sensor IDs and the time information included in the transmission data output from the event extractor 422 and the sensor position information stored in advance (Step S108). Specifically, first, the position locator 423 calculates a difference in arrival time of the elastic waves 11 between the plurality of sensors 20. Then, the position locator 423 locates the positions of the elastic wave sources using the sensor position information and information of the difference in arrival time.

The position locator 423 performs the process of Step S108 when transmission data for one event is output from the event extractor 422 in a measurement period. Accordingly, the position locator 423 locates the positions of the plurality of elastic wave sources. The position locator 423 outputs the position information of the plurality of elastic wave sources to the distribution generator 424. The acquirer 421 acquires temperature information from the outside (Step S109). The acquirer 421 outputs the acquired temperature information to the corrector 425. The timing at which the acquirer 421 acquires the temperature information is not limited to the aforementioned timing and can be set before the routine of FIG. 7 is started or before correction is performed by the corrector 425.

The distribution generator 424 generates an elastic wave source distribution using the position information of the plurality of elastic wave sources output from the position locator 423. Specifically, the distribution generator 424 generates the elastic wave source distribution by plotting the positions of the elastic wave sources indicated by the acquired position information of the plurality of elastic wave sources onto virtual data. The distribution generator 424 generates an elastic wave source density distribution using the generated elastic wave source distribution (Step S110). Specifically, first, the distribution generator 424 divides the elastic wave source distribution into a plurality of areas by partitioning the elastic wave source distribution into predetermined sections. Then, the distribution generator 424 calculates an elastic wave source density for each area. Then, the distribution generator 424 generates the elastic wave source density distribution by allocating the values of the calculated elastic wave source density for each area to the areas. The distribution generator 424 outputs the generated elastic wave source density distribution to the corrector 425.

The corrector 425 receives the elastic wave source density distribution output from the distribution generator 424, the correction table stored in the storage 43, and the temperature information output from the acquirer 421 as inputs. The corrector 425 corrects the elastic wave source density distribution on the basis of the input elastic wave source density distribution, the input correction table, and the input temperature information (Step S111). The corrector 425 outputs the corrected elastic wave source density distribution to the evaluator 426.

The evaluator 426 evaluates the deterioration state of the structure using the corrected elastic wave source density distribution. The evaluator 426 outputs the evaluation result to the display 44. The display 44 displays the evaluation result output from the evaluator 426 (Step S112). For example, the display 44 may display the corrected elastic wave source density distribution as the evaluation result or may display an area considered as a damaged area in a display mode different from that in the other areas.

Figure 8:
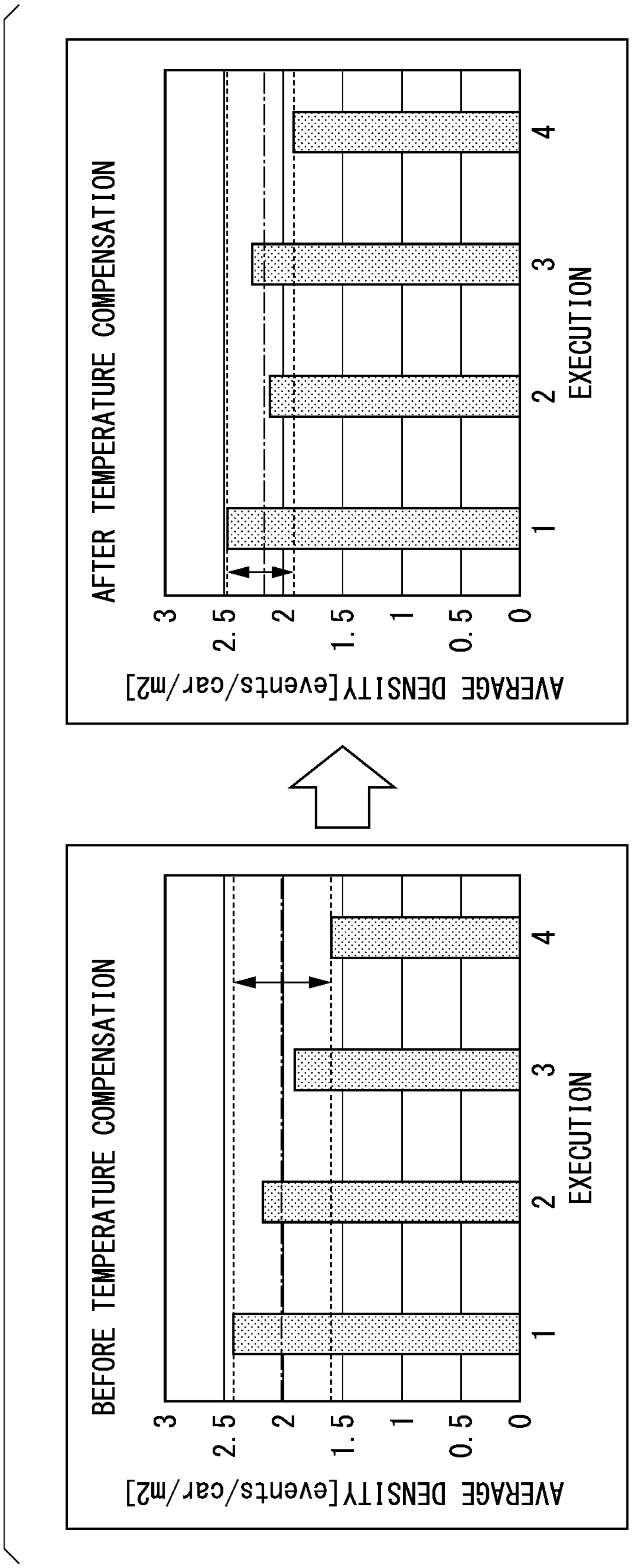
FIG. 8 is a diagram illustrating effects of the first embodiment.

FIG. 8 is a diagram illustrating advantages of the first embodiment. The left part of FIG. 8 illustrates an evaluation result of densities of elastic wave sources when they are measured in different temperature environments, and the right part of FIG. 8 illustrates a temperature correction result based on the technique according to this embodiment. The average density of elastic wave sources before temperature correction (the left part of FIG. 8) is 2.0 (+0.4 to −0.43) and the average density of elastic wave sources after temperature correction (the right part of FIG. 8) is 2.2 (+0.28 to −0.28), and thus it can be seen that an error range has decreased by 32%.

In the structure evaluation system 100 having the aforementioned configuration, the elastic wave source density distribution is corrected on the basis of the Young's modulus corresponding to the temperature and the density of elastic wave sources. Accordingly, it is possible to generate an elastic wave source density distribution in consideration of an influence of the temperature. By evaluating the deterioration state of the structure using the acquired elastic wave source distribution, it is possible to enhance evaluation accuracy of the deterioration state of the structure.

Second Embodiment

In a second embodiment, a configuration for performing correction using a method simpler than that in the first embodiment will be described below. The system configuration and the device configurations in the second embodiment are the same as those in the first embodiment. The second embodiment is different from the first embodiment in that the correction table is not used and in the correction line and the process of the corrector 425. The differences will be mainly described below.

The corrector 425 corrects information based on the position location in the position locator 423 using a correction value which is determined according to the temperature information of the structure 50 acquired by the acquirer 421. The correction value determined according to the temperature information of the structure 50 in the second embodiment is a correction value for correcting the densities of the elastic wave source density distribution. The information based on the position location in the second embodiment is the elastic wave source density distribution.

(Correction Method in Second Embodiment)

Figure 9:
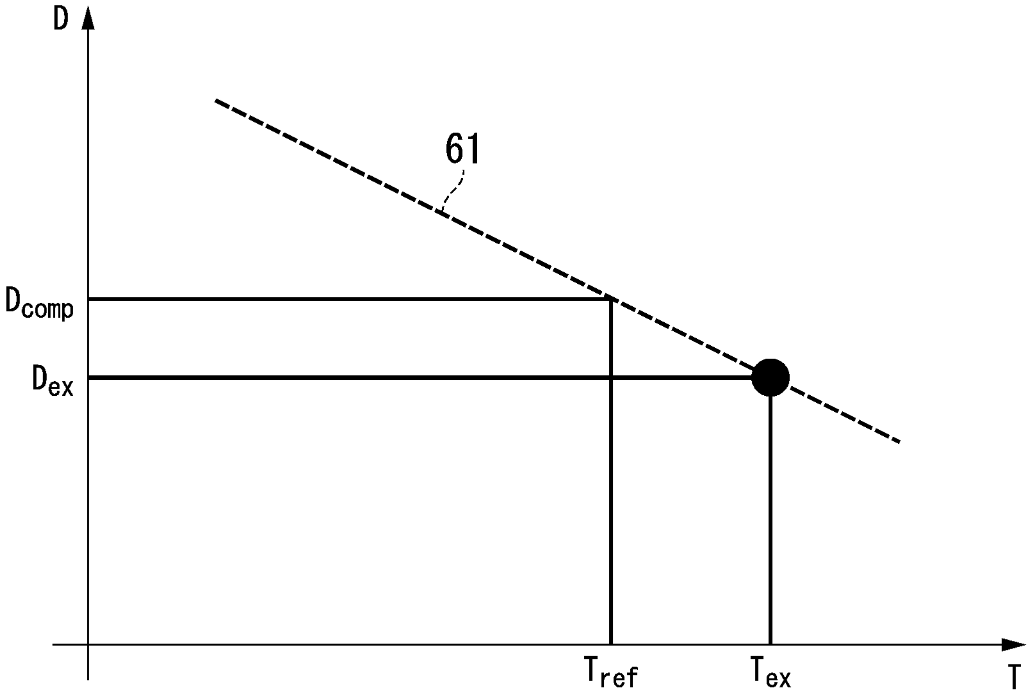
FIG. 9 is a diagram illustrating a correction process which is performed by a corrector according to a second embodiment.

A correction process which is performed by the corrector 425 according to the second embodiment will be described below with reference to FIG. 9. In FIG. 9, $T_{ex}$ denotes the temperature at the time of measurement, $D_{ex}$ denotes the measured density of elastic wave sources (a density of a certain area), $T_{ref}$ denotes the reference temperature (for example, 20° C.), and $D_{comp}$ denotes the corrected density of elastic wave sources. In FIG. 9, a correction line 61 is a straight line used for correction based on the relationship between the density D of elastic wave sources and the temperature T. The correction line 61 is a straight line acquired by calculating the slope when the density D of elastic wave sources acquired under a plurality of temperature conditions in advance and the temperature T are plotted through linear approximation. The correction line 61 has a predetermined slope according to the density D of elastic wave sources acquired under a plurality of temperature conditions in advance and the temperature T. The correction line 61 may be stored in the storage 43.

The corrector 425 corrects the elastic wave source density distribution on the basis of the temperature information at the time of measurement of elastic waves and the correction line 61. At this time, the corrector 425 corrects the elastic wave source density distribution by correcting the density for each area in the elastic wave source density distribution. First, the corrector 425 acquires the temperature information from the acquirer 421. For example, it is assumed that the temperature indicated by the temperature information acquired by the corrector 425 is $T_{ex}$. Then, the corrector 425 acquires an elastic wave source density $D_{ex}$ in one area in the elastic wave source density distribution. The corrector 425 sets the correction line 61 at intersections of the temperature $T_{ex}$ and the elastic wave source density $D_{ex}$ in a graph illustrating a relationship between the elastic wave source density D and the temperature T (in which the horizontal axis represents the temperature T and the vertical axis represents the elastic wave source density D). The corrector 425 acquires the corrected elastic wave source density $D_{comp}$ derived from the reference temperature $T_{ref}$ as a correction value with reference to the correction line 61 set in the graph illustrating the relationship between the elastic wave source density D and the temperature T. Then, the corrector 425 performs correction such that the elastic wave source density D in one area reaches the correction value (for example, the elastic wave source density $D_{comp}$). The corrector 425 performs the same process on each area. Accordingly, the elastic wave source density distribution is corrected.

In this way, the corrector 425 according to the second embodiment performs correction such that the elastic wave source density D increases at a predetermined rate when the temperature indicated by the acquired temperature information is high and the elastic wave source density D decreases at a predetermined rate when the temperature is low. In general, it is known that the temperature of the pavement section and the atmospheric temperature (temperature) have a proportional relationship (for example, see Citation 3).

(Citation 3: Li. T, "Influencing Parameters on Tire-Pavement Interaction Noise: Review, Experiments and Design Considerations", Designs 2018, 2, 38.)

From Citation 3, it can be seen that the slope when the relationship between the elastic wave source density D and the atmospheric temperature acquired under a plurality of temperature conditions in advance is plotted may be calculated and corrected through linear approximation. Particularly, the correction value can be calculated such that the density increases at a predetermined rate when the atmospheric temperature is high and the density decreases at a predetermined rate when the atmospheric temperature is low.

Third Embodiment

In a third embodiment, a configuration for correcting a density using intermediate parameters will be described below. The system configuration and the device configurations in the third embodiment are the same as those in the first embodiment and the second embodiment. The third embodiment is different from the first embodiment and the second embodiment in that the correction table is not used and in the correction line and the process of the corrector 425. The differences will be mainly described below.

The corrector 425 in the third embodiment corrects the elastic wave source density D using a correction value which is acquired on the basis of a relationship between one of the intermediate parameters (for example, an interatomic distance, a Young's modulus, a volume modulus, an acoustic impedance, a transmittance, AE amplitude, an AE hit count, and an AE location count) and the elastic wave source density D.

(Correction Method in Third Embodiment)

A correction process which is performed by the corrector 425 according to the third embodiment will be described below. Here, it is assumed that the acoustic impedance Z is used as the intermediate parameter. The acoustic impedance in the following description can be replaced with a term indicating another intermediate parameter when the other intermediate parameter is used. Here, $Z_{ex}$ denotes the acoustic impedance at the time of measurement, $D_{ex}$ denotes the measured density of elastic wave sources (a density of a certain area), $Z_{ref}$ denotes a reference acoustic impedance at a predetermined temperature (for example, an acoustic impedance at 20° C.), and $D_{comp}$ denotes the corrected density of elastic wave sources. A correction line when the acoustic impedance Z is used as an intermediate parameter is a straight line used for correction based on the relationship between the density D of elastic wave sources and the acoustic impedance Z. The correction line is a straight line acquired by calculating the slope when the density D of elastic wave sources acquired under a plurality of acoustic impedance conditions in advance and the acoustic impedance Z are plotted through linear approximation. The correction line has a predetermined slope according to the density D of elastic wave sources acquired under a plurality of acoustic impedance conditions in advance and the acoustic impedance Z. The correction line may be stored in the storage 43.

The corrector 425 corrects the elastic wave source density distribution on the basis of the acoustic impedance at the time of measurement of elastic waves and the correction line. At this time, the corrector 425 corrects the elastic wave source density distribution by correcting the density for each area in the elastic wave source density distribution. First, the corrector 425 acquires acoustic impedance information from the acquirer 421. For example, it is assumed that the acoustic impedance indicated by the acoustic impedance information acquired by the corrector 425 is $Z_{ex}$. Then, the corrector 425 acquires an elastic wave source density $D_{ex}$ in one area in the elastic wave source density distribution. The corrector 425 sets the correction line at intersections of the acoustic impedance $Z_{ex}$ and the elastic wave source density $D_{ex}$ in a graph illustrating a relationship between the elastic wave source density D and the acoustic impedance Z (in which the horizontal axis represents the acoustic impedance Z and the vertical axis represents the elastic wave source density D). The corrector 425 acquires the corrected elastic wave source density $D_{comp}$ derived from the reference acoustic impedance $Z_{ref}$ as a correction value with reference to the correction line set in the graph illustrating the relationship between the elastic wave source density D and the acoustic impedance Z. Then, the corrector 425 performs correction such that the elastic wave source density D in one area reaches the correction value (for example, the elastic wave source density $D_{comp}$). The corrector 425 performs the same process on each area. Accordingly, the elastic wave source density distribution is corrected.

In the structure evaluation system 100 according to the third embodiment having the aforementioned configuration, similarly to the first embodiment and the second embodiment, it is also possible to generate an elastic wave source density distribution in consideration of an influence of the temperature when an intermediate parameter is used. By evaluating the deterioration state of the structure using the acquired elastic wave source distribution, it is possible to enhance evaluation accuracy of the deterioration state of the structure.

Fourth Embodiment

The first to third embodiments have described the configuration for correcting a density above. In a fourth embodiment, a configuration for correcting a hit count by changing a threshold value for detecting a hit will be described. The system configuration in the fourth embodiment is the same as that in the first to third embodiments. The fourth embodiment is different from the first to third embodiments in that the corrector 425 is provided in the signal processor 30 and in the process of the corrector 425. The differences will be mainly described below.

In the fourth embodiment, the corrector 425 is provided in the signal processor 30. The corrector 425 corrects information based on the position location in the position locator 423 using a correction value which is determined according to the temperature information of the structure 50. The correction value which is determined according to the temperature information of the structure 50 in the fourth embodiment is a correction value for correcting a threshold value of the gate generation circuit. The information based on the position location in the fourth embodiment is a threshold value of the gate generation circuit. The corrector 425 may be provided in the structure evaluation apparatus 40. In this case, information on the threshold value of the gate generation circuit 302 can be transmitted from the corrector 425 in the structure evaluation apparatus 40 to the gate generation circuit 302 in the signal processor 30.

(Correction Method in Fourth Embodiment)

The corrector 425 corrects the hit count by changing the threshold value in the gate generation circuit 302. More specifically, the corrector 425 corrects the threshold value in the gate generation circuit 302 with reference to a correction table in which each predetermined temperature is correlated with a threshold value. A high hit count is detected when the threshold value is decreased, and a low hit count is detected when the threshold value is increased. Since the hit count and the density have a correlation, the corrector 425 performs correction such that the threshold value increases when the elastic wave source density D decreases and the threshold value decreases when the elastic wave source density D increases. For example, the corrector 425 acquires temperature information before measurement from the outside. The temperature information may be acquired from the acquirer 421 of the structure evaluation apparatus 40 or may be acquired from the other. The corrector 425 acquires the threshold value corresponding to the temperature indicated by the acquired temperature information as a correction value with reference to the correction table. The corrector 425 corrects the threshold value of the gate generation circuit 302 such that the acquired correction value is reached.

In the structure evaluation apparatus 40, the distribution generator 424 outputs the generated elastic wave source density distribution to the evaluator 426. The evaluator 426 evaluates the deterioration state of the structure on the basis of the elastic wave source density distribution output from the distribution generator 424.

Modified Example 1 Common to Embodiments

The signal processor 30 may be provided in the structure evaluation apparatus 40.

Modified Example 2 Common to Embodiments

In the aforementioned embodiments, a configuration in which the plurality of sensors 20-1 to **20-*n* are connected to one signal processor 30 have been described above. The structure evaluation system 100 may include a plurality of signal processors 30, and the sensors 20 may be connected to different signal processors 30**.

Modified Example 3 Common to Embodiments

Some or all of the functional units provided in the structure evaluation apparatus 40 may be provided in another device. For example, the display 44 provided in the structure evaluation apparatus 40 may be provided in another device. In this configuration, the structure evaluation apparatus 40 transmits the evaluation result to the other device including the display 44. The other device including the display 44 displays the received evaluation result.

According to at least one of the aforementioned embodiments, since a plurality of sensors 20 that detect elastic waves generated from a structure 50, the position locator 423 that locates positions of sources of a plurality of elastic waves detected by the plurality of sensors 20 on the basis of the plurality of elastic waves, the corrector 425 that corrects information based on the position location in the position locator 423 using the correction value which is determined according to the temperature of the structure, and the evaluator 426 that evaluates the deterioration state of the structure on the basis of the corrected information are provided, it is possible to enhance evaluation accuracy of the deterioration state of the structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:

a plurality of elastic wave sensors; and a controller comprising a processor and a memory, the controller being configured to:

locate positions of sources of a plurality of elastic waves generated from a structure and detected by the plurality of elastic wave sensors on the basis of the plurality of elastic waves;

correct information based on the position locations using a correction value which is determined according to a temperature of the structure; and evaluate a deterioration state of the structure on the basis of the corrected information, wherein:

the information is corrected using a first correction value or a second correction value as the correction value, the first correction value being a value for correcting a density for each area of an elastic wave source density distribution which represents a distribution showing density values determined according to the number of elastic wave sources in each area, and the second correction value being a value for correcting a threshold for detecting elastic wave hits, wherein the controller corrects the density for each area in the elastic wave source density distribution using the first correction value obtained based on the temperature of the structure, a correction line, and the elastic wave source density distribution, and the correction line is obtained based on:

a relationship between Young's modulus corresponding to the temperature of the structure and the density of elastic wave sources in the elastic wave source density distribution;

a relationship between the temperature of the structure and the density of elastic wave sources in the elastic wave source density distribution; or a relationship between an acoustic impedance corresponding to the temperature of the structure and the density of elastic wave sources in the elastic wave source density distribution.

2. The structure evaluation system according to claim 1, wherein the structure has a structure formed of at least two materials with different responses to temperature.

3. The structure evaluation system according to claim 1, wherein the structure includes a pavement section on which at least vehicles are able to travel and a floor slab section that supports the pavement section, and wherein the temperature of the structure is a value associated with a temperature of the pavement section.

4. The structure evaluation system according to claim 3, wherein the information based on the position location includes information on a density, and wherein the information is corrected using the correction value such that the density increases when the temperature of the pavement section is high and the density decreases when the temperature of the pavement section is low.

5. The structure evaluation system according to claim 4, wherein the correction value is calculated with reference to a correction table in which a value of a Young's modulus at each temperature is registered.

6. The structure evaluation system according to claim 1, wherein the information is corrected such that a threshold value for detecting the plurality of elastic waves decreases when the temperature of the structure is high and the threshold value increases when the temperature of the structure is low.

7. The structure evaluation system according to claim 3, wherein the value associated with the temperature of the pavement section is an atmospheric temperature.

8. The structure evaluation system according to claim 3, wherein the value associated with the temperature of the pavement section is a temperature of a bottom surface of the floor slab section.

9. The structure evaluation system according to claim 3, wherein the value associated with the temperature of the pavement section is a road surface temperature which is measured by a temperature sensor attached to a vehicle traveling on the pavement section.

10. The structure evaluation system according to claim 3, wherein the value associated with the temperature of the pavement section is an amount of solar radiation.

11. The structure evaluation system according to claim 3, wherein the value associated with the temperature of the pavement section is a value of one of an interatomic distance, a Young's modulus, a volume modulus, an acoustic impedance, a transmittance, a reflectance, elastic wave amplitude, a hit count of elastic waves, and a location count of elastic waves.

12. The structure evaluation system according to claim 3, wherein the temperature of the structure is a value associated with one of a difference or a ratio of temperatures between the temperature of the pavement section and the temperature of the floor slab section.

13. The structure evaluation system according to claim 11, wherein the temperature of the pavement section is a value which is estimated by one of an atmospheric temperature or an amount of solar radiation or a temperature of a top surface of the pavement section, and the temperature of the floor slab section is a temperature of a bottom surface of the floor slab section.

14. The structure evaluation system according to claim 3, wherein the value associated with the temperature of the pavement section is a statistic value of measured temperatures.

15. A structure evaluation apparatus comprising:

a controller comprising a processor and a memory, the controller being configured to:

locate positions of sources of a plurality of elastic waves detected by a plurality of elastic wave sensors that detect elastic waves generated from a structure on the basis of the plurality of elastic waves;

correct information based on the position locations using a correction value which is determined according to a temperature of the structure; and evaluate a deterioration state of the structure on the basis of the corrected information, wherein:

the information is corrected using a first correction value or a second correction value as the correction value, the first correction value being a value for correcting a density for each area of an elastic wave source density distribution which represents a distribution showing density values determined according to the number of elastic wave sources in each area, the second correction value being a value for correcting a threshold for detecting elastic wave hits, wherein the controller corrects the density for each area in the elastic wave source density distribution using the first correction value obtained based on the temperature of the structure, a correction line, and the elastic wave source density distribution, and the correction line is obtained based on:

a relationship between Young's modulus corresponding to the temperature of the structure and the density of elastic wave sources in the elastic wave source density distribution;

a relationship between the temperature of the structure and the density of elastic wave sources in the elastic wave source density distribution; or a relationship between an acoustic impedance corresponding to the temperature of the structure and the density of elastic wave sources in the elastic wave source density distribution.

16. A structure evaluation method executed by a computer comprising:

detecting a plurality of elastic waves generated from a structure using a plurality of elastic wave sensors;

locating positions of sources of a plurality of elastic waves on the basis of the detected plurality of elastic waves;

correcting information based on the position location using a correction value which is determined according to a temperature of the structure; and evaluating a deterioration state of the structure on the basis of the corrected information, wherein:

the information is corrected using a first correction value or a second correction value as the correction value, the first correction value being a value for correcting a density for each area of an elastic wave source density distribution which represents a distribution showing density values determined according to the number of elastic wave sources in each area, the second correction value being a value for correcting a threshold for detecting elastic wave hits, wherein the correcting the density for each area in the elastic wave source density distribution using the first correction value obtained based on the temperature of the structure, a correction line, and the elastic wave source density distribution, and the correction line is obtained based on:

a relationship between Young's modulus corresponding to the temperature of the structure and the density of elastic wave sources in the elastic wave source density distribution;

a relationship between the temperature of the structure and the density of elastic wave sources in the elastic wave source density distribution; or a relationship between an acoustic impedance corresponding to the temperature of the structure and the density of elastic wave sources in the elastic wave source density distribution.

17. A non-transitory computer readable recording medium storing a computer program which enables a computer to execute the following processing:

locating positions of sources of a plurality of elastic waves detected by a plurality of elastic wave sensors that detect elastic waves generated from a structure on the basis of the plurality of elastic waves;

correcting information based on the position location in the position locating step using a correction value which is determined according to a temperature of the structure; and evaluating a deterioration state of the structure on the basis of the corrected information, wherein:

the information is corrected using a first correction value or a second correction value as the correction value, the first correction value being a value for correcting a density for each area of an elastic wave source density distribution which represents a distribution showing density values determined according to the number of elastic wave sources in each area, the second correction value being a value for correcting a threshold for detecting elastic wave hits, wherein the correcting corrects the density for each area in the elastic wave source density distribution using the first correction value obtained based on the temperature of the structure, a correction line, and the elastic wave source density distribution, and the correction line is obtained based on:

a relationship between Young's modulus corresponding to the temperature of the structure and the density of elastic wave sources in the elastic wave source density distribution;

a relationship between the temperature of the structure and the density of elastic wave sources in the elastic wave source density distribution; or a relationship between an acoustic impedance corresponding to the temperature of the structure and the density of elastic wave sources in the elastic wave source density distribution.

18. The structure evaluation system according to claim 1, wherein each of the plurality of elastic wave sensors comprises one of a piezoelectric element or an acceleration sensor.

19. The structure evaluation system according to claim 1, wherein each of the plurality of elastic wave sensors converts the detected elastic waves into an electrical signal.

20. The structure evaluation method according to claim 16, wherein detecting elastic waves generated from a structure comprises detecting the elastic waves using the plurality of elastic wave sensors, each of the plurality of elastic wave sensors comprising one of a piezoelectric element or an acceleration sensor.

* * * * *